(12) United States Patent
Ma et al.

(10) Patent No.: US 10,767,469 B2
(45) Date of Patent: Sep. 8, 2020

(54) TRANSCEIVER WITH ANNULAR RING OF HIGH MAGNETIC PERMEABILITY MATERIAL FOR ENHANCED SHORT HOP COMMUNICATIONS

(71) Applicant: Halliburton Energy Services, Inc., Houston, TX (US)

(72) Inventors: Jin Ma, Houston, TX (US); Glenn Andrew Wilson, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 220 days.

(21) Appl. No.: 15/761,324

(22) PCT Filed: Oct. 28, 2015

(86) PCT No.: PCT/US2015/057818
§ 371 (c)(1),
(2) Date: Mar. 19, 2018

(87) PCT Pub. No.: WO2017/074353
PCT Pub. Date: May 4, 2017

(65) Prior Publication Data
US 2018/0291730 A1  Oct. 11, 2018

(51) Int. Cl.
*E21B 47/13* (2012.01)
*E21B 47/017* (2012.01)
(Continued)

(52) U.S. Cl.
CPC ............ *E21B 47/13* (2020.05); *E21B 17/003* (2013.01); *E21B 47/017* (2020.05); *F16L 25/02* (2013.01);
(Continued)

(58) Field of Classification Search
CPC ........ E21B 47/122; E21B 47/011; H04B 1/40
See application file for complete search history.

(56) References Cited

U.S. PATENT DOCUMENTS 4,348,672 A * 9/1982 Givler .................. E21B 17/003
175/320
4,496,174 A * 1/1985 McDonald ............ E21B 47/122
285/53

(Continued)

FOREIGN PATENT DOCUMENTS

GB       2453061       7/2008
WO      2015031973     3/2015

OTHER PUBLICATIONS

Pauto Tubel., et al; "Mud Pulser Telemetry System for Down Hole Measurement-While-Drilling", IEEE, 1992.
(Continued)

*Primary Examiner* — Blake E Michener
(74) *Attorney, Agent, or Firm* — Jason Sedano; C. Tumey Law Group PLLC (57) ABSTRACT

A method of forming a short-hop communications transceiver includes creating, in a conductive tool body, an annular cavity that is electromagnetically coupled to an external tool surface by a surface gap that encircles the tool body. The method further includes positioning material having high magnetic permeability in the annular cavity. The method further includes coupling electrical leads from an electronics module to opposite sides of the surface gap. The method further includes operating the electronics module to perform short-hop telemetry by driving or sensing a voltage signal across the surface gap.

16 Claims, 5 Drawing Sheets

(51) Int. Cl.
*E21B 17/00* (2006.01)
*F16L 25/02* (2006.01)
*E21B 4/02* (2006.01)
*E21B 47/024* (2006.01)
*H04B 1/40* (2015.01)

(52) U.S. Cl.
CPC ............... *E21B 4/02* (2013.01); *E21B 47/024* (2013.01); *H04B 1/40* (2013.01)

(56) References Cited

U.S. PATENT DOCUMENTS

| | | | |
|---|---|---|---|
| 5,160,925 A | 11/1992 | Dailey et al. | |
| 6,098,727 A * | 8/2000 | Ringgenberg | E21B 17/028 175/325.2 |
| 6,392,561 B1 | 3/2002 | Davies et al. | |
| 6,445,307 B1 | 9/2002 | Rassi et al. | |
| 6,727,827 B1 | 8/2004 | Edwards et al. | |
| 6,926,098 B2 * | 8/2005 | Peter | E21B 17/003 175/320 |
| 7,252,160 B2 * | 8/2007 | Dopf | E21B 17/003 166/242.6 |
| 7,362,235 B1 | 8/2008 | Norman et al. | |
| 7,477,162 B2 * | 1/2009 | Clark | E21B 47/01 166/248 |
| 7,525,315 B2 * | 4/2009 | Fredette | E21B 47/01 324/339 |
| 7,573,397 B2 * | 8/2009 | Petrovic | E21B 47/12 340/854.6 |
| 7,782,060 B2 * | 8/2010 | Clark | E21B 47/01 175/50 |
| 8,242,929 B2 | 8/2012 | Vornbrock | |
| 8,648,733 B2 * | 2/2014 | Dopf | E21B 47/122 175/40 |
| 9,851,465 B2 * | 12/2017 | Wang | G01V 3/00 |
| 9,909,369 B2 * | 3/2018 | Logan | F16L 15/08 |
| 10,119,393 B2 * | 11/2018 | Derkacz | E21B 47/122 |
| 2002/0126021 A1 * | 9/2002 | Vinegar | E21B 43/122 340/854.3 |
| 2006/0022840 A1 * | 2/2006 | Spring | E21B 17/003 340/854.3 |
| 2006/0208738 A1 | 9/2006 | Moore | |
| 2007/0247330 A1 * | 10/2007 | Clark | E21B 47/01 340/854.6 |
| 2008/0211687 A1 | 9/2008 | Price et al. | |
| 2009/0153355 A1 | 6/2009 | Price et al. | |
| 2010/0033344 A1 | 2/2010 | Rozenblit et al. | |
| 2011/0234230 A1 | 11/2011 | Bittar et al. | |
| 2011/0309949 A1 * | 12/2011 | Dopf | E21B 17/003 340/854.6 |
| 2014/0132271 A1 * | 5/2014 | Liu | G01V 3/20 324/338 |
| 2014/0368350 A1 * | 12/2014 | Wang | G01V 3/00 340/854.4 |
| 2015/0002307 A1 | 1/2015 | Graf et al. | |
| 2015/0330155 A1 * | 11/2015 | Logan | F16L 15/08 166/380 |
| 2017/0211378 A1 * | 7/2017 | Derkacz | E21B 47/122 |
| 2017/0298724 A1 * | 10/2017 | Ma | E21B 47/122 |
| 2017/0342986 A1 * | 11/2017 | Ma | E21B 47/122 |
| 2018/0245458 A1 * | 8/2018 | Ma | E21B 47/122 |

OTHER PUBLICATIONS

International Search Report and Written Opinion for PCT/US2015/057818 dated Jul. 28, 2016.

Extended European Search Report for Application No. 15907456.6 dated Aug. 28, 2018.

\* cited by examiner

TRANSCEIVER WITH ANNULAR RING OF HIGH MAGNETIC PERMEABILITY MATERIAL FOR ENHANCED SHORT HOP COMMUNICATIONS

BACKGROUND

In the oil and gas industry, various sensor systems or packages have been developed for placement on or near the drill bit. Such sensors permit characterization of subsurface formations as the bit approaches or enters the formation, minimizing unnecessary drilling. Also, the trajectory of the drill bit may be adjusted in response to the characterization. However, to effectively use such sensors and perform such adjustments, the sensed data must be communicated to the surface.

It is common to have a telemetry sub in the bottomhole assembly that can communicate with the surface via an internal tool bus among other tools in the bottomhole assembly. Yet that telemetry sub is separated from the bit by a mud motor and/or steering assembly which, due to the high torques, high stresses, and high relative rotation rates created within these units, have not permitted the installation of tool bus wires in the standard fashion.

This situation creates a need for a "short-hop" telemetry system to bridge the communications gap between the at-bit sensors and the wired tool bus of the bottomhole assembly. Various systems have been proposed for such short-hop communications, including the use of electromagnetic fields and currents in the bottomhole assembly. These systems may be inordinately complex and expensive.

BRIEF DESCRIPTION OF THE DRAWINGS

Accordingly, there are disclosed herein various short-hop communications systems and methods employing a surface gap over an annular cavity containing a ring of high magnetic permeability material. In the following detailed description of the various disclosed embodiments, reference will be made to the accompanying drawings in which.

It should be understood, however, that the specific embodiments given in the drawings and detailed description thereto do not limit the disclosure. On the contrary, they provide the foundation for one of ordinary skill to discern the alternative forms, equivalents, and modifications that are encompassed together with one or more of the given embodiments in the scope of the appended claims.

NOTATION AND NOMENCLATURE

Certain terms are used throughout the following description and claims to refer to particular system components and configurations. As one of ordinary skill will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ". Also, the term "couple" or "couples" is intended to mean either an indirect or a direct electrical or physical connection. Thus, if a first device couples to a second device, that connection may be through a direct electrical connection, through an indirect electrical connection via other devices and connections, through a direct physical connection, or through an indirect physical connection via other devices and connections in various embodiments.

DETAILED DESCRIPTION

The issues identified in the background are at least partly addressed by systems and methods of short-hop communications using transceivers including a surface gap over an annular cavity containing high magnetic permeability material. This configuration may enable toroid antennas to be replaced, retaining their sensitivity and structural advantages without requiring vulnerable antenna coil windings. The short-hop transceiver includes a cavity within the steel tool body and a magnetic core within the cavity. A surface gap that encircles the tool body electromagnetically couples the cavity to the surface of the tool. This design has a similar efficiency as a toroid transceiver while being simpler and more reliable.

Figure 1:
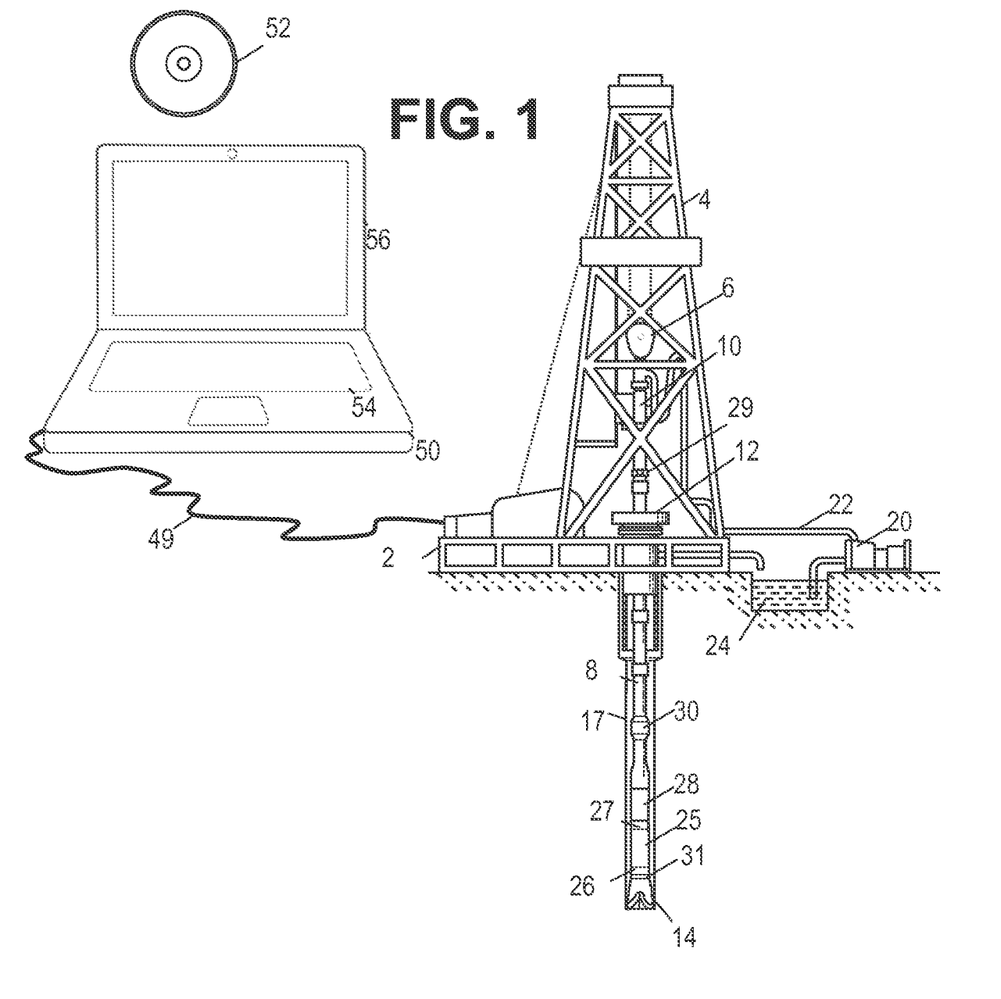
FIG. 1 is a contextual view of an illustrative drilling environment.

The disclosed systems and methods for using such a short-hop transceiver are best understood in terms of the context in which they are employed. As such, FIG. 1 shows a well during drilling operations. A drilling platform 2 is equipped with a derrick 4 that supports a hoist 6. Drilling of the well is carried out by a string of drill pipes connected together by "tool" joints so as to form a drill string 8. The hoist 6 suspends a kelly 10 that lowers the drill string 8 through a rotary table 12. Connected to the lower end of the drill string 8 is a drill bit 14. The drill bit 14 is rotated and drilling is accomplished by use of a downhole motor 25 near the drill bit 14.

Drilling fluid, termed mud, is pumped by mud recirculation equipment 20 through a supply pipe 22, through the kelly 10, and down through the drill string 8 at high pressures and volumes to emerge through nozzles or jets in the drill bit 14. The mud then travels back up the hole via the annulus formed between the exterior of the drill string 8 and the borehole wall 17, through a blowout preventer, and into a mud pit 24 on the surface. On the surface, the drilling mud is cleaned and then recirculated by the recirculation equipment 20.

Downhole sensors 31 are located in the drillstring 8 on or near the drill bit 14 and below the motor 25. The sensors 31 may include navigational instrumentation that measures the position and orientation of the downhole sensors 31. The sensed data, which may include logging while drilling (LWD) data, is communicated across the motor 25 by short-hop transceivers 26, 27 to the acoustic telemetry sub 28, to an acoustic telemetry receiver 29, and ultimately to a data processing system 50 at the surface, which may be coupled to the drilling equipment by a cable 49. The data processing system 50 includes internal data storage and memory having software (represented by removable information storage media 52), along with one or more processor cores that execute the software. The software configures the system to interact with a user via one or more input/output devices (such as a keyboard 54 and display 56). Among other things, the system 50 processes data received from the acquisition module 38 and generates a representative display.

The acoustic telemetry sub 28 transmits telemetry signals received from the short-hop transceiver 27 in the form of acoustic vibrations in the tubing wall of the drill sting, and the acoustic telemetry receiver 29 may be coupled to the kelly 10. One or more repeaters 30 may be provided along the drill string to receive and retransmit the telemetry signals. The repeaters 30 may include both an acoustic telemetry receiver and an acoustic telemetry transmitter. The short-hop transceivers 26, 27 are described in detail with respect to FIGS. 2-6.

Figure 2:
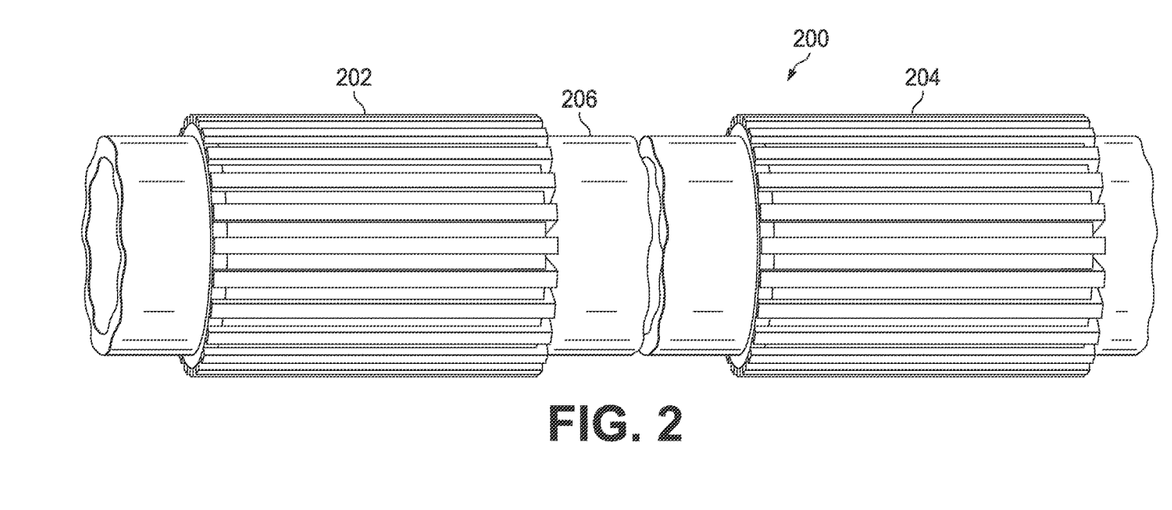
FIG. 2 is an external view of an illustrative short-hop communications system including two toroidal transceivers.

FIG. 2 is an external view of a short-hop communications system 200 including two toroidal short-hop transceivers 202, 204. Both short-hop transceivers 202, 204 may operate as transmitters and receivers. For clarity, short-hop transceiver 202 will be described in the following example as a toroidal short-hop transmitter, and short-hop transceiver 204 as the toroidal short-hop receiver. The toroidal short-hop transmitter 202 operates when an alternating current is supplied to the windings around the core. A changing current in the windings induces a changing magnetic field in the core, which in turn induces a current in the drill string 206, which passes along the conductive body of the motor and/or steering assembly. The current flows along the drill string 206 where part of the current radiates into the surrounding formation and returns to the drillstring on the opposite side of the toroidal transmitter 202, and the rest of the current continues to flow in the drill string 206 through the toroidal short-hop receiver 204 and beyond. The current induces a changing magnetic field in the core of the toroidal short-hop receiver 204, which in turn induces a changing voltage that is measured in the windings of the short-hop receiver 204.

The toroidal short-hop transceivers 202, 204 are subject to excessive assembly and maintenance costs because of the windings. Specifically, the windings are relatively vulnerable to damage in the high-temperature, high-pressure, high-vibration conditions of the downhole environment. Additionally, each time a toroidal short-hop transceiver 202, 204 fails, it is difficult to repair or replace.

Figure 3:
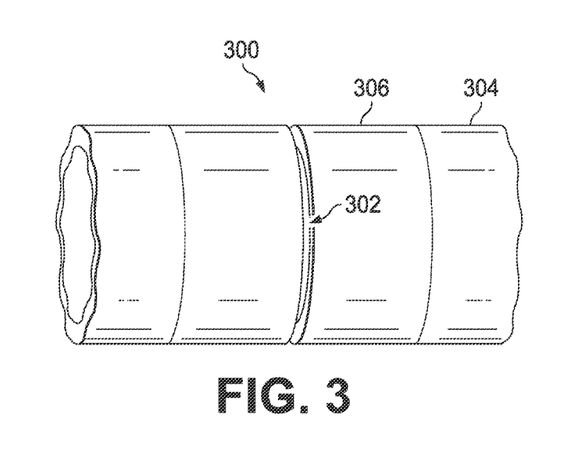
FIG. 3 is an external view of an illustrative enhanced short-hop communications transceiver.

FIG. 3 is an external view of an illustrative enhanced short-hop communications transceiver 300. The short-hop transceiver 300 does not include coil windings or housing to protect coil windings, and thus is relatively flush with the drill string 304. A surface gap 302 includes a break in the surface of the short-hop transceiver, which may be filled with an insulator such as polyether ether ketone (PEEK) or another resistive plastic that electrically separates two sides of the transceiver body 306 and the drill string 304 at the outer diameter. In at least one embodiment, the surface gap includes a material that is injected into an annular cavity of the short-hop transceiver 300 as a liquid, thus taking the shape of the cavity, but that hardens into a solid over time. While insulated, a potential difference Vt may be applied across the gap as discussed below. The annular cavity is illustrated in FIG. 4.

Figure 4:
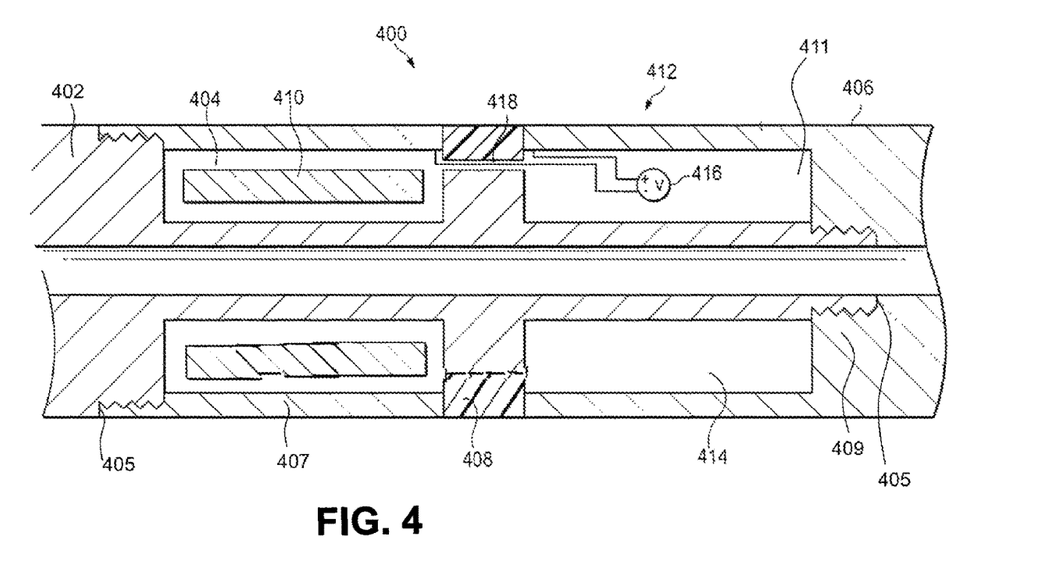
FIG. 4 is a partially exploded, cross-sectional view of the illustrative enhanced short-hop communications transceiver with a threaded assembly.

FIG. 4 is a partially exploded, cross-sectional view of the illustrative enhanced short-hop communications transceiver 400 with a threaded assembly. The short-hop transceiver 400 includes a conductive body 402 with an annular cavity 404 between the inner and outer diameter of the body 402. The conductive body 402 may be a drill collar in a bottomhole assembly. The annular cavity 404 is circumferential with respect to the body 402, and as such, appears on both sides of the cross section, which is parallel to the cylindrical axis of the drill string. During assembly, the annular cavity 404 may be formed on a first portion of the body 402, and the center of the annular cavity 404 may be made shallower than the ends in order to partially separate the annular cavity 404 into two housings when fully assembled: one housing for a high magnetic permeability material 410 and another housing for an electronics module 412 called the electronics housing 414. The electronics housing 414 may be coupled to the high magnetic permeability material 410 housing or may be separate from the high magnetic permeability material 410 housing in various embodiments.

The short-hop transceiver 400 also includes a ring of high magnetic permeability material 410, such as ferrite, mu-metal, or metallic glass, in the annular cavity 404. The ring 410 is also circumferential with respect to the body 402, and during assembly may be formed as one piece that slides into the annular cavity 404 or multiple pieces assembled around the first portion of the body 402 within the annular cavity 404.

The annular cavity 404 is electromagnetically coupled to an external surface 406 of the short-hop transceiver 400 by a surface gap 408 that encircles the body 402. During assembly, the surface gap 302 may be filled by inserting a liquid resistive plastic into one or more portions of the annular cavity 404. The plastic may surround the ring 410 and harden, thus encapsulating the ring 410, and also electrically separating two sides of the body 402.

The short-hop transceiver 400 further includes an electronics module 412 within the electronics housing 414, and the electronics module 412 may include circuit elements formed on a circuit board. A voltage source 416 included in the electronics module 412 is coupled to opposite sides of the surface gap 408 using leads such as wires. A wire passage 418 within the conductive body 402 may facilitate such coupling. During assembly of the short-hop transceiver 400, the electronics module 412 may be preassembled and placed into the electronics housing 414 before sealing the annular cavity 404 and coupling the portions of the body 402. As illustrated, the electronics housing 414 cavity is decoupled from the ring 410 housing when the threads are mated. The electronics module 412 may employ frequency division multiplexing for concurrent sensing and sending of current along the drill string, and may alternate between the two. The receive signal and the transmit signal each may include a carrier frequency in excess of 1 kHz. The carrier frequency may also be less than 100 kHz. At the carrier frequencies, an impedance is provided between opposite sides of the surface gap 408 in excess of 1 ohm in at least one embodiment.

During assembly, the two portions tool body 402 may be coupled using the threaded assembly. When coupled, the annular cavity 404 is sealed to prevent downhole conditions from disturbing the high magnetic permeability material 410 and electronics module 412. Other assemblies may be used for coupling, and FIG. 5 illustrates a clasped assembly.

Figure 5:
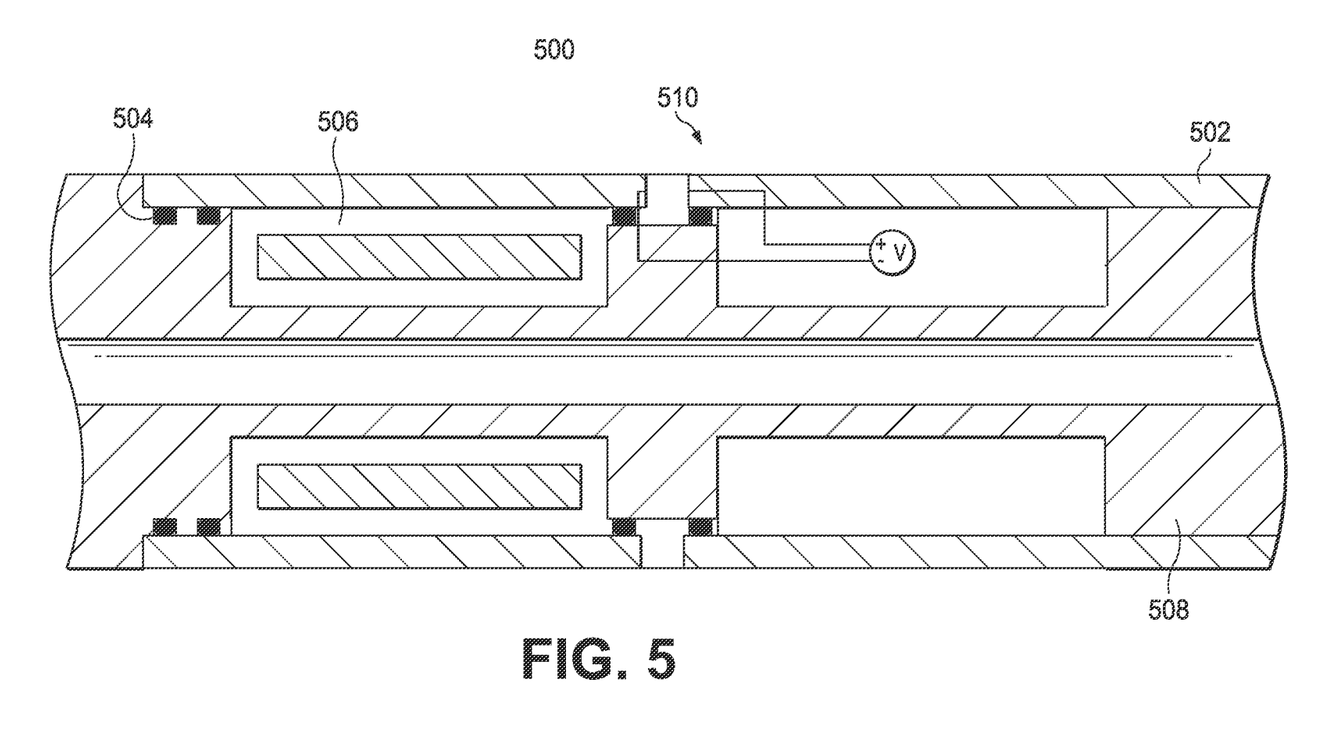
FIG. 5 is a cross-sectional view of the illustrative enhanced short-hop communications transceiver with a clasp assembly.

FIG. 5 is a cross-sectional view of the illustrative enhanced short-hop communications transceiver 500 including the same components as the short-hop transceiver of FIG. 4, but including a clasped assembly 510 instead of a threaded assembly. Specifically, the clasped assembly 510 includes a clasp or latch that couples the external transceiver body 502 covering the annular cavity 506 to the internal transceiver body 508 in which the recess that forms the annular cavity 506 is created. O-rings 504 may facilitate seating of the internal and external portions of the short-hop transceiver 500. The short-hop transceivers of FIGS. 3-5 may be formed using the method described with respect to FIG. 6.

Figure 6:
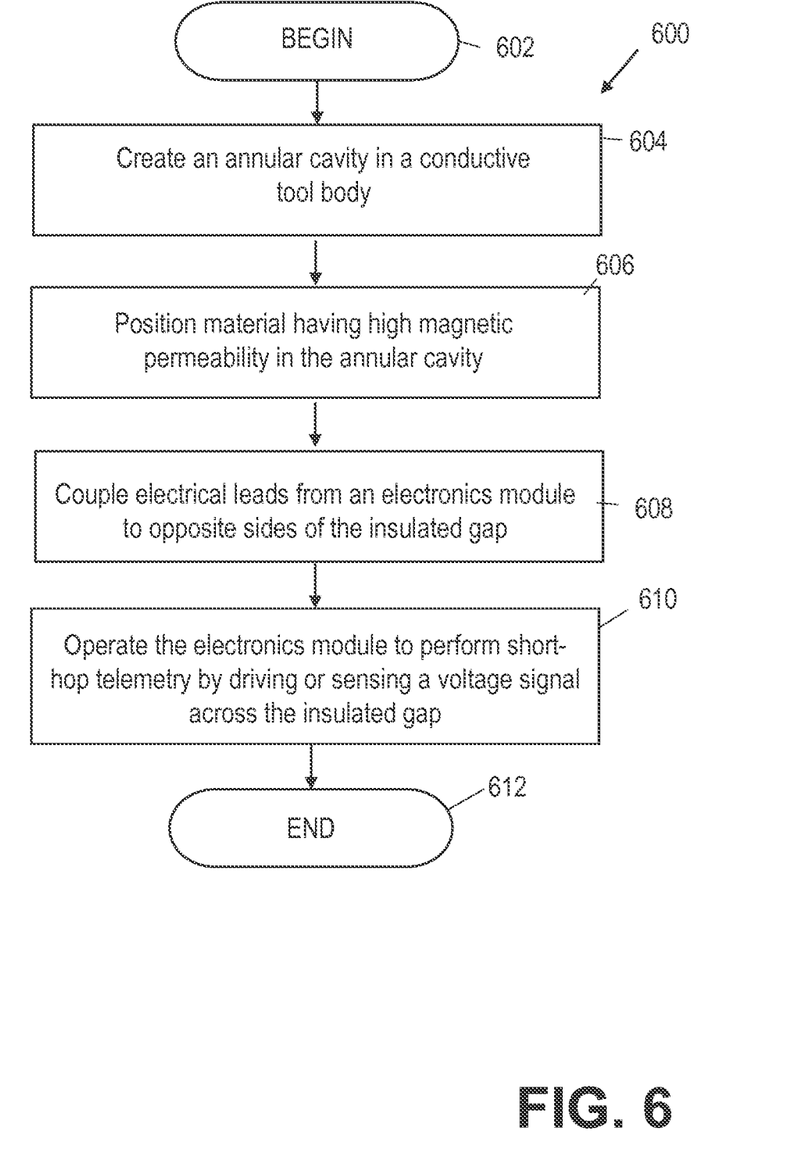
FIG. 6 is a flow diagram of an illustrative method of forming an enhanced short-hop communications transceiver.

FIG. 6 is a flow diagram of an illustrative method 600 of forming an enhanced short-hop communications transceiver beginning at 602 and ending at 612. At 604, an annular cavity is created in a conductive tool body. For example, an external recess near one end of a tubular body, such as an internal portion of the short-hop transceiver, may be formed, and the recess may include annular shoulders 405. At the end of the tubular body, threads or a clasp assembly may be provided for coupling to another tubular body, i.e. the external portion of the short-hop transceiver.

At 606, a material having high magnetic perme-ability, such as the materials described above, is positioned in the annular cavity 404. The high magnetic permeability material may form a ring, or may be assembled to form a ring. For example, a conductive sleeve 407 may be secured in place over the shoulders 405 with an insulator separating the sleeve from the shoulders. Next, a threaded connector 409 may cover the annular cavity 404, and when fully mated, a surface gap 408 encir-cling the transceiver body may remain between the sleeve 407 and the threaded connector 409. Next, the surface gap 408 may be filled by an insulating ring including the materials described above. The annular cavity 404 is electromagnetically coupled to an external tool surface by the surface gap. The threaded connector 409 may cover a second annular cavity that receives an electronics module.

At 608, electrical leads from the electronics module are coupled to opposite sides of the surface gap. The leads are coupled to a voltage source included in the electronics module to provide a potential difference across the surface gap. At the carrier frequency, the tool has may have an impedance between opposite sides of the gap with a magnitude in excess of 1 ohm.

At 610, the electronics module is operated to perform short-hop telemetry by driving or sensing a voltage signal across the surface gap. Accordingly in the transmitter, a current loop is formed by the tool body about the cavity. The current loop induces a changing magnetic field in the core of the receiver, which in turn induces a changing voltage that is measured across the surface gap of the receiver. However, unlike the toroidal system described above, the disclosed system is simpler and more reliable due to the lack of relatively fragile coil windings and housings for the windings.

In at least one embodiment, a method of forming a short-hop communications transceiver includes creating, in a conductive tool body, an annular cavity that is electromagnetically coupled to an external tool surface by a surface gap that encircles the tool body. The method further includes positioning material having high magnetic permeability in the annular cavity. The method further includes coupling electrical leads from an electronics module to opposite sides of the surface gap. The method further includes operating the electronics module to perform short-hop telemetry by driving or sensing a voltage signal across the surface gap.

In another embodiment, a short-hop communications transceiver includes a conductive tool body having an annular cavity that is electromagnetically coupled to an external tool surface by a surface gap that encircles the tool body. The transceiver further includes a ring of high magnetic permeability material in the annular cavity. The transceiver further includes an electronics module coupled between opposite sides of the surface gap to sense a receive signal and send a transmit signal for communication with another transceiver.

In another embodiment, a short-hop communications system includes a bottomhole assembly including a mud motor and other tubular components having conductive bodies. The system further includes first and second communications transceivers on opposite sides of the mud motor. At least one of the communications transceivers includes a conductive body having an annular cavity that is electromagnetically coupled to an external tool surface by a surface gap that encircles the conductive body; a ring of high magnetic permeability material in the annular cavity; and an electronics module coupled between opposite sides of the surface gap to sense a receive signal and send a transmit signal for communication with the other communications transceiver.

The following features may be incorporated into the various embodiments. The high magnetic permeability material may form a ring. The voltage signal may include a carrier frequency in between 1 kHz and 100 kHz. At the carrier frequency, the tool has may have an impedance between opposite sides of the gap with a magnitude in excess of 1 ohm. The creating may include forming an external recess near one end of a tubular body, the recess including annular shoulders 405; securing a conductive sleeve 407 in place over the shoulders 405 with an insulator separating the sleeve 407 from at least one shoulder 405; and threading the end of the tubular body to a threaded connector 409. When fully threaded, a surface gap 408 may remain between the sleeve 407 and the threaded connector 409. An insulating ring may fill the surface gap 408. The threaded connector 409 may cover a second annular cavity that receives the electronics module 411. The conductive tool body may be a drill collar in a bottomhole assembly, and the bottomhole assembly may include the other transceiver. The electronics module may alternate between sensing and sending. The electronics module may employ frequency division multiplexing for concurrent sensing and sending. The receive signal and the transmit signal each may include a carrier frequency in between 1 kHz and 100 kHz. At the carrier frequencies, the tool may provide an impedance between opposite sides of the surface gap with a magnitude in excess of 1 ohm. The ring may include ferrite.

While the present disclosure has been described with respect to a limited number of embodiments, those skilled in the art will appreciate numerous modifications and variations therefrom. It is intended that the appended claims cover all such modifications and variations.

What is claimed is:

1. A method of forming a short-hop communications transceiver comprising:
   creating in a conductive tool body an annular cavity that is formed in an external tool surface of the conductive body and is electromagnetically coupled to the external tool surface of the conductive body by a surface gap that encircles the conductive tool body;
   positioning a material in the annular cavity, wherein the material is a ferrite, a mu-metal, or a metallic glass, and does not consist of one or more coil windings wound around the material;
   coupling electrical leads from an electronics module to opposite sides of the surface gap; and
   operating the electronics module to perform short-hop telemetry by driving or sensing a voltage signal across the surface gap.

2. The method of claim 1, wherein the material forms a ring.

3. The method of claim 1, wherein the voltage signal comprises a carrier frequency in between 1 kHz and 100 kHz.

4. The method of claim 3, wherein at the carrier frequency, the conductive tool body has an impedance between opposite sides of the gap with a magnitude in excess of 1 ohm.

5. The method of claim 1, wherein said creating includes:
forming the annular cavity near one end of the conductive tool body, the annular cavity including annular shoulders;
securing a conductive sleeve in place over the shoulders with an insulator separating the sleeve from at least one shoulder;
threading the end of the conductive tool body to a threaded connector, wherein when fully threaded, the surface gap remains between the sleeve and the threaded connector.

6. The method of claim 5, wherein an insulating ring fills the surface gap.

7. The method of claim 5, wherein the threaded connector covers a second annular cavity that receives the electronics module.

8. A short-hop communications transceiver that comprises:
a conductive tool body having an annular cavity that is electromagnetically coupled to an external tool surface of the conductive tool body by a surface gap that encircles the conductive tool body;
a ring of material in the annular cavity, wherein the ring of material is a ferrite, a mu-metal, or a metallic glass, and does not consist of one or more coil windings wound around the material;
an electronics module coupled between opposite sides of the surface gap is configured to sense a receive signal and send a transmit signal for communication with another transceiver using frequency division multiplexing.

9. The transceiver of claim 8, wherein the conductive tool body is a drill collar in a bottomhole assembly, and wherein the bottomhole assembly includes the other transceiver.

10. The transceiver of claim 8, wherein the receive signal and the transmit signal each comprises a carrier frequency in between 1 kHz and 100 kHz.

11. The transceiver of claim 10, wherein at the carrier frequencies, the tool provides an impedance between opposite sides of the surface gap with a magnitude in excess of 1 ohm.

12. The transceiver of claim 8, wherein the ring comprises ferrite.

13. A short-hop communications system that comprises:
a bottomhole assembly including a mud motor and a steering assembly having conductive bodies;
first and second communications transceivers on opposite sides of the mud motor, wherein at least one of the communications transceivers includes:
a conductive body having an annular cavity that is electromagnetically coupled to an external tool surface of the conductive body by a surface gap that encircles the conductive body;
a ring of material in the annular cavity, wherein the ring of material is a ferrite, a mu-metal, or a metallic glass and does not consist of one or more coil windings wound around the material;
an electronics module coupled between opposite sides of the surface gap is configured to sense a receive signal and send a transmit signal for communication with the other communications transceiver using frequency division multiplexing.

14. The system of claim 13, wherein the receive signal and the transmit signal each comprises a carrier frequency in between 1 kHz and 100 kHz.

15. The system of claim 14, wherein at the carrier frequencies, the tool provides an impedance between opposite sides of the surface gap with a magnitude in excess of 1 ohm.

16. The system of claim 13, wherein the ring comprises ferrite.

* * * * *